Jan. 3, 1950 R. W. POINTER 2,493,022
OSCILLATING AXLE SUSPENSION
Filed Nov. 28, 1945 5 Sheets-Sheet 2
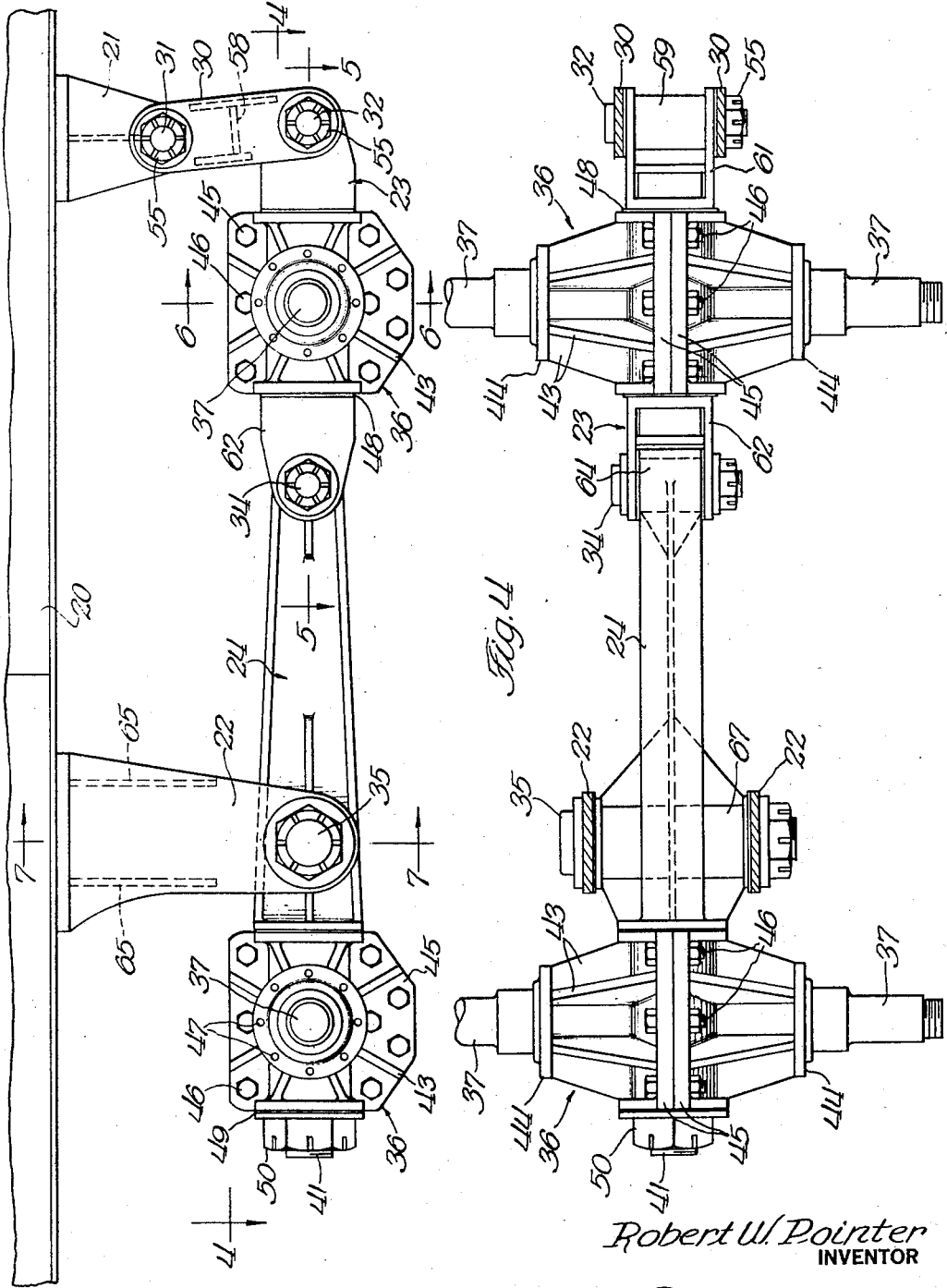
Robert W. Pointer
INVENTOR
BY Harold D. Cook
ATTORNEY Jan. 3, 1950     R. W. POINTER     2,493,022
OSCILLATING AXLE SUSPENSION
Filed Nov. 28, 1945     5 Sheets-Sheet 3
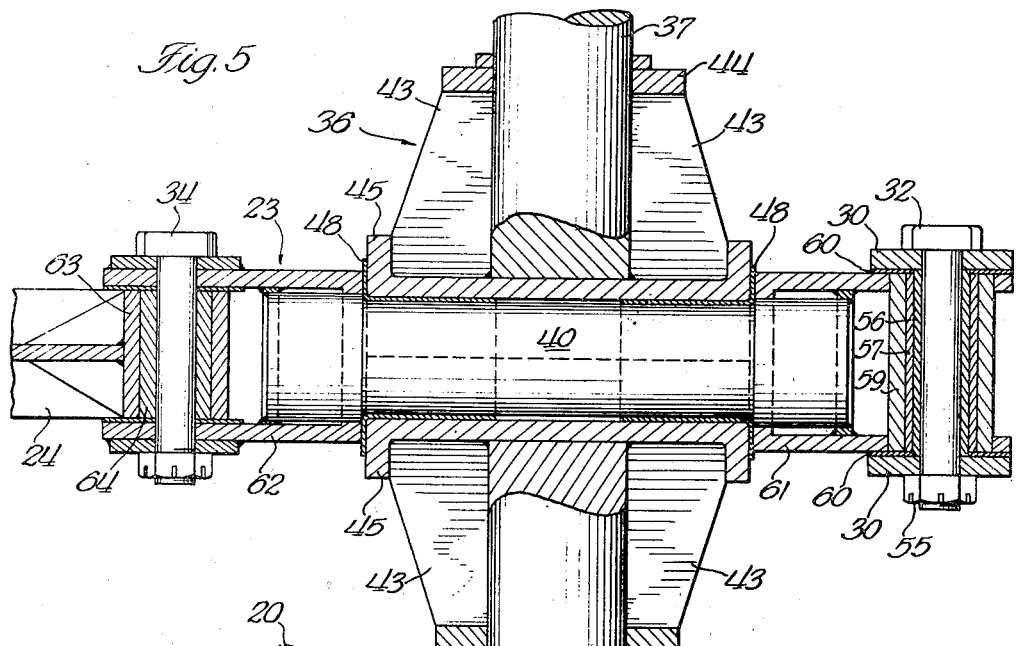
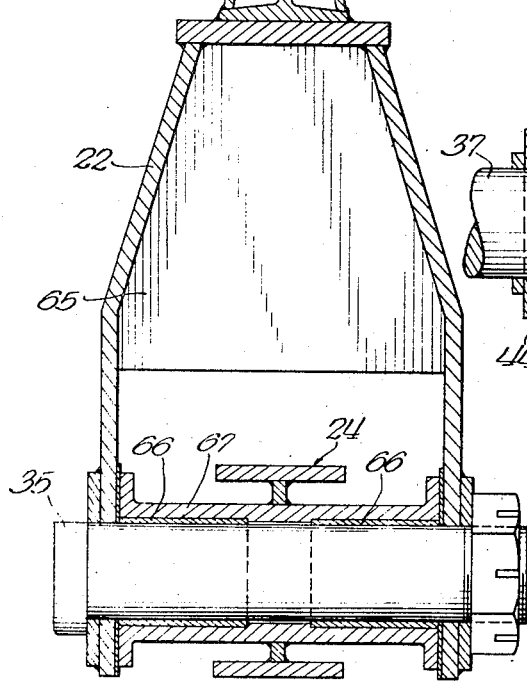
Robert W. Pointer
INVENTOR
BY Harold D. Cook
ATTORNEY Robert W. Pointer
INVENTOR BY Harold D. Cook
ATTORNEY Jan. 3, 1950 R. W. POINTER 2,493,022
OSCILLATING AXLE SUSPENSION
Filed Nov. 28, 1945 5 Sheets—Sheet 5

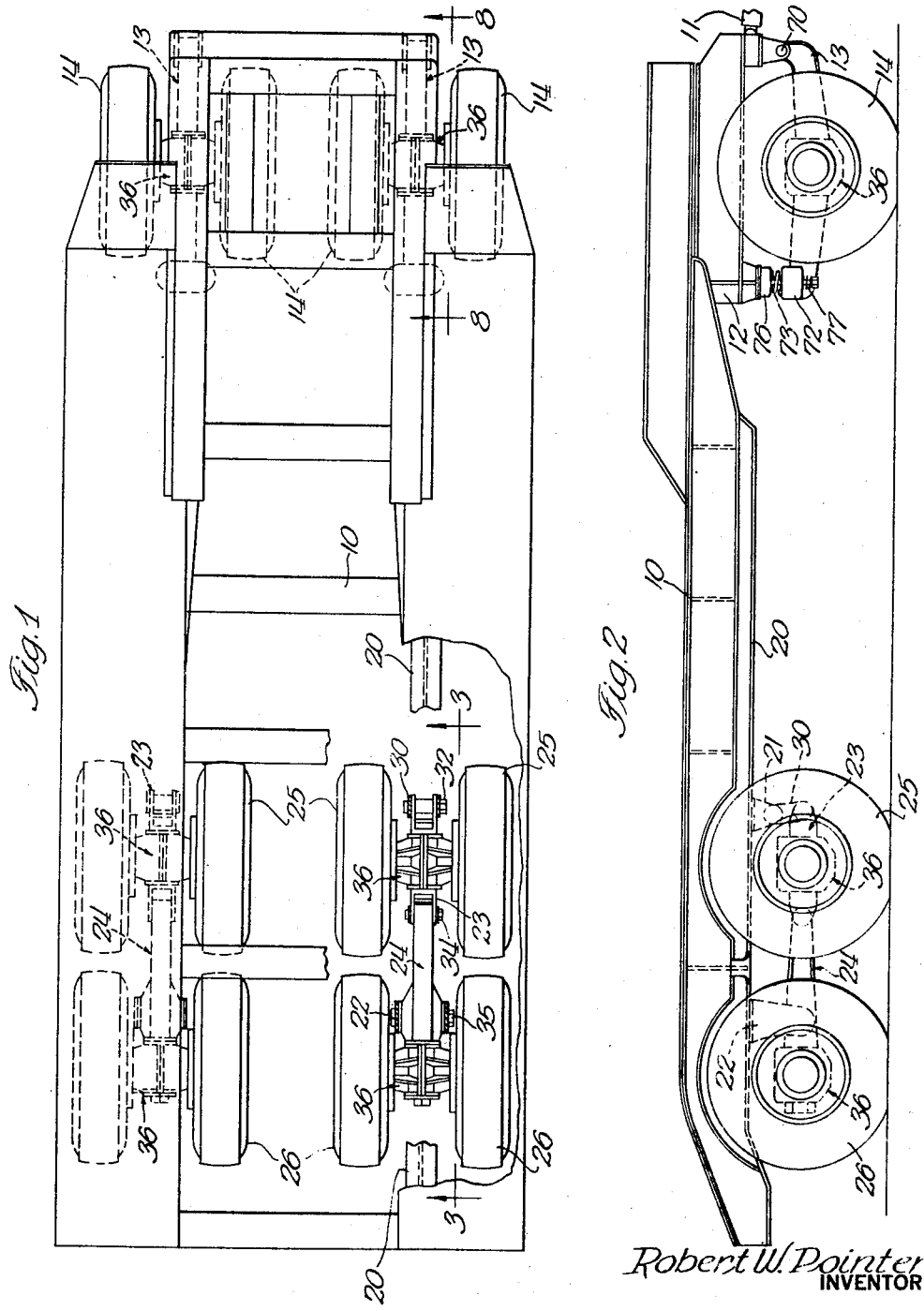

Robert W. Pointer
INVENTOR

BY Harold D. Cook
ATTORNEY

Patented Jan. 3, 1950

2,493,022

UNITED STATES PATENT OFFICE 2,493,022

OSCILLATING AXLE SUSPENSION

Robert W. Pointer, Portland, Oreg.

Application November 28, 1945, Serial No. 631,288

10 Claims. (Cl. 280—104.5)

This invention relates to improvements in vehicle suspension and running gear, and has particular reference to novel dual wheel suspensions for heavy vehicles.

The present invention is to be distinguished from so-called dual wheel arrangements in which two tires are mounted close together on a single wheel and brake assembly at each end of a common axle. In such arrangements each pair of adjacent tires functions as an inflexible unit to take the place of a single larger tire. The two tires, being on the same wheel, must at all times rotate together regardless of unequal tracking distances on curves and in turning. They are also constrained to maintain the same axle height above the road surface in spite of differences in tire diameters and uneven road surface conditions. There being no flexibility in the mounting to accommodate itself to road and driving conditions, all such inequalities must be compensated for by tire dragging or tire flexing, which very materially shortens tire life and adds to the tractive effort required to move the vehicle.

The object, in general, of the present invention is to provide a novel suspension for a plurality of vehicle road wheels having inherent flexibility of accommodation to road surfaces to avoid dragging or overloading the individual tires.

A further object is to provide a dual wheel type of suspension which will accommodate itself to the wheel tracks on the road surface so that the wheels will share the load and maintain independent rolling traction at all times so as to reduce the drawbar pull required to move a given load.

A further object is to provide a multi-wheeled vehicle suspension having the wheels spaced for improved weight distribution, stability, and cooling characteristics.

Another object is to provide dual wheel assemblies wherein the individual wheels are mounted for independent rotation and braking.

In carrying out the foregoing objects, a particular object of the invention is to provide a novel oscillating axle suspension for dual wheel assemblies.

A still further object is to provide a novel walking beam suspension having dual wheel assemblies mounted on oscillating axles.

An additional object is to provide a double walking beam suspension carrying dual wheels on oscillating axles, wherein the walking beams are interconnected in such a manner as to neutralize torque reactions from the wheels.

With these and other objects in view, the invention resides in the construction and arrangement of parts shown by way of example in the accompanying drawings of certain preferred embodiments. It is to be understood, however, that the invention also includes all such changes and modifications as fall within the scope of the appended claims.

The present running gear embodies a dual beam type of suspension serving to redistribute the load on the various wheels as they pass over uneven road surfaces so as to obviate the necessity for springs. Springs may be employed, however, if desired. The vehicle is supported on front and rear walking beams pivotally connected together, and connected with the frame of the vehicle by shackle and pivot means allowing movements of the beams in a vertical plane. The front walking beam is provided with a longitudinal trunnion intermediate its ends for carrying the oscillating stub axles of a dual wheel assembly, the stub axles extending on opposite sides of the trunnion so that the wheels straddle the beam. In a similar manner, an identical dual wheel assembly is mounted for oscillation about a trunnion on the rear end of the rear walking beam. The terms front and rear ends are used primarily for reference in connection with the description of the illustrated embodiment, and not by way of limitation, inasmuch as the present system may be caused to travel in either direction.

The above described arrangement provides an individual wheel and brake for each tire, the spacing of the wheels under the vehicle being optimum for heat dissipation, load distribution on the road surface, and stability against overturning. This type of suspension is of especial advantage for both highway and non-highway use. On the highway the load is spread out, both longitudinally and laterally to minimize weight concentration at any one point on the pavement. The free rolling action of all the wheels regardless of road crown, differences in tire diameter, and differences in tracking distances on curves prolongs tire life and reduces drawbar pull. This, in turn, enables higher trucking speeds and greater fuel economy. On rough terrain, such as open country and logging roads, the flexibility of the system is such as to enable a vehicle equipped therewith to negotiate ground surfaces of such unevenness as to be impassable to similarly loaded vehicles with conventional suspensions.

The construction of the preferred embodiments will now be described with reference to the accompanying drawings, in which:

Figure 1 is a plan view of a full trailer unit embodying the present invention;

Figure 2 is a side elevation view of the trailer shown in Figure 1;

Figure 3 is a side elevation view of the dual walking beam assembly, taken on the line 3—3 of Figure 1;

Figure 4 is a plan view of the walking beam assembly, taken on the line 4—4 of Figure 3;

Figure 5 is a sectional view through the front walking beam of the dual beam assembly, taken on the line 5—5 of Figure 3;

Figure 6 is a transverse sectional view through the oscillating axles on the front walking beam, taken on the line 6—6 of Figure 3;

Figure 7 is a transverse sectional view through the rear bracket, taken on the line 7—7 of Figure 3;

Figure 8:
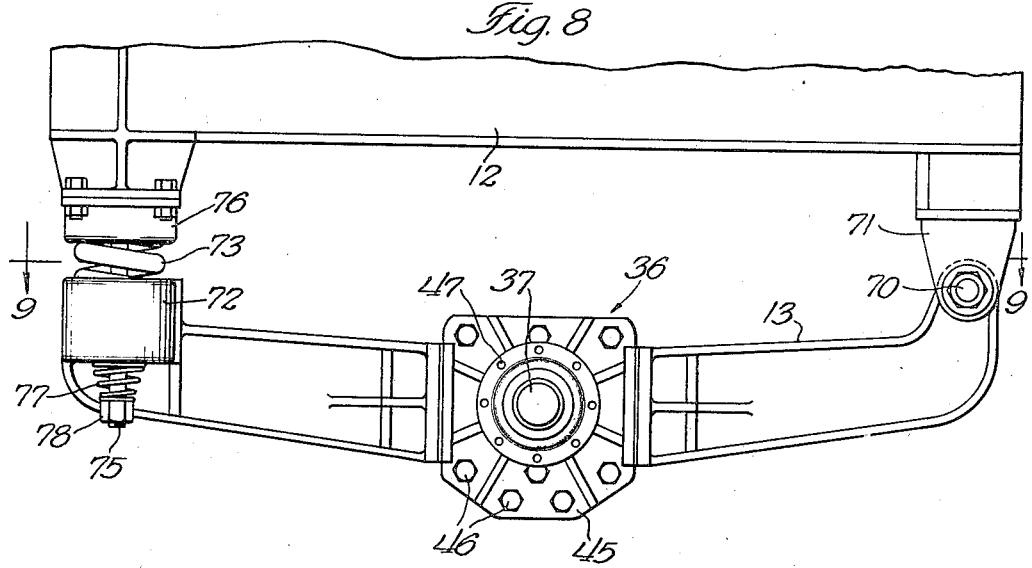
Figure 8 is a side view of the front limber of the trailer, being taken on the line 8—8 of Figure 1.

Referring first to Figures 1 and 2, the numeral 10 designates a full trailer unit embodying the features of the present invention and adapted to be pulled by a drawbar 11 connected with an automotive tractor unit. The drawbar 11 is attached to a front limber 12 having a fifth wheel connection with the frame of the trailer. On either side of the limber 12 is a pivotally mounted beam 13 carrying a pair of wheels 14 mounted on oscillating axles. The details of this construction will hereinafter be described with reference to Figures 8 and 9.

The suspension for the rear end of the vehicle embodies a dual walking beam assembly for mounting four independent wheels on each side of the vehicle. Each of the dual beam assemblies is hung vertically beneath a longitudinal frame member 20 on brackets or hangers 21 and 22 secured to the under sides of such members. The dual beams comprise a front walking beam 23 and rear walking beam 24 having oscillating axles mounting the pairs of wheels 25 and 26, respectively. By means of the constructional features illustrated in Figure 3 and in the other figures of the drawings relating thereto, it will be seen that the present suspension system has inherent flexibility to adjust itself to great unevenness of ground surface while maintaining complete free rolling traction and substantially equal weight distribution on all wheels. When either pair of wheels 25 or 26 encounters an elevation or depression in the road surface, relative pivotal movement takes place between the beams 23 and 24 to maintain approximately predetermined load distribution on the two pairs of wheels regardless of such ground irregularities. When either one of the wheels of either of these pairs encounters an elevation or depression, the wheels of each pair may oscillate as a unit about longitudinal trunnions presently to be described so as to maintain all the wheels on the ground and sharing the load. Also, as the description proceeds it will be seen that the linkage between the walking beams is such as to neutralize torque reaction between the pairs of wheels 25 and 26 so that if the brakes are suddenly applied both pairs of wheels will maintain their ground contact to share the braking effort.

The present walking beam linkage is a modification of the dual beam, dual axle suspension disclosed and claimed in my copending application entitled Beam suspension for vehicles, Serial No. 632,549, filed December 3, 1945.

The front end of the front walking beam 23 is hung on a shackle 30 having shackle pins 31 and 32 providing pivotal connection with the bracket 21 and the rear end is pivotally connected with the rear walking beam 24 through a pin 34. A pin 35 provides pivotal mounting for the rear walking beam in the bracket 22. Each of the walking beams carries an oscillating axle unit 36 having oppositely directed stub axles comprising wheel spindles 37 straddling the beam for mounting the pairs of wheels 25 and 26 on opposite sides thereof. The front walking beam 23 carries its oscillating axle unit on a trunnion 40 in its mid portion, while the rear walking beam 24 carries its oscillating axle unit at its rear end on an overhanging trunnion or journal 41.

The oscillating axle units 36 are made in identical halves which may be bolted together on the trunnion. This is necessary for assembly in the case of the trunnion 40 which has no free end, and for the sake of uniformity and standardization the same construction is used on the trunnion 41. Each identical half of an oscillating axle unit 36 comprises a spindle 37, a bushing half 42, a plurality of webs or gusset plates 43, a brake mounting flange 44 and a center flange 45 forming a sturdy, integral unit. The center flange 45 is provided with holes between the gussets for bolts 46 uniting two such halves to make the complete oscillating axle unit 36. The unit 36 for the trunnion 41 may be bolted together before mounting on the trunnion, but the mating halves on the central trunnion 40 must be bolted together in place. Brake mounting flanges 44 are circular and have holes 47 drilled therein between the gussets for mounting brake assemblies for the wheels. On the trunnion 40 split bushings 48 are inserted in pairs when the oscillating axle units are assembled. Suitable flanged bushing elements 49 are employed on the trunnion 41, the nut 50 being tightened against a shoulder on the trunnion without binding the oscillating axle unit.

On the shackle pins 31 and 32 it is desirable to have bushings against which nuts 55 may be tightened on the shackle without binding the pivotal connection. One such bushing is shown at 56 in Figure 5 on the pin 32. It is also desirable to employ a floating bushing 57 of a different material, one of the bushings being of bronze and the other being of steel, for example. Similar bushings are provided on the pin 31. The shackle 30 is subjected to severe twisting stresses, and the arrangement of bushings just described to permit the secure tightening of the nuts 55, together with the provision of webbing members 58, provide the necessary stiffness and rigidity in the shackle. When the shackle connections are assembled and tightened in the manner described the inner bushing 56 is nonrotative on the pin 32, but the outer bushing 57 floats thereon carrying the walking beam bearing 59. Washers 60 may be added to reduce end friction.

As shown in Figure 5, the front walking beam 23 comprises a central cylindrical journal 40 integrally united with end portions 61 and 62 of hollow box construction. The end 61 contains the bearing tube 59 for connection with the supporting shackle, and the end 62 carries the pin 34 for connection with the rear walking beam. The rear walking beam 24 has a bearing tube 63 containing a bushing 64 on the pin 34. The construction of the rear bracket 22 is shown in Figures 3 and 7, both the bracket and the vehicle frame being webbed and braced for stiffness. Webs 65 in the bracket assure a rigid support for the pin 35 which has bushings 66 carrying the bearing tube 67 on the rear walking beam.

From the foregoing description it will be observed that the double beam suspension includes no springs. The flexibility of the system is such that when large low pressure tires are used no springs are required. The oscillating axles have free pivotal movement through a considerable angle to accommodate for transverse irregularities in the road surface. Elevations and depressions encountered by the wheels 25 and 26 in succession are negotiated by the play of the walking beams whereby the two sets of wheels may rise and fall equal distances in an inverse relation without raising or lowering the vehicle. Under all conditions the individual wheels continue to share the load, regardless of oscillating movements of the axles and vertical play of the walking beams. When the brakes are applied the wheel torques in the two sets of wheels 25 and 26 oppose and neutralize each other through the pivot pin 34 to maintain equal braking effort on all wheels. There is no tendency for the rear wheels to lift off the ground in quick stops as occurs in conventional single beam suspensions having two axles.

Figure 9:
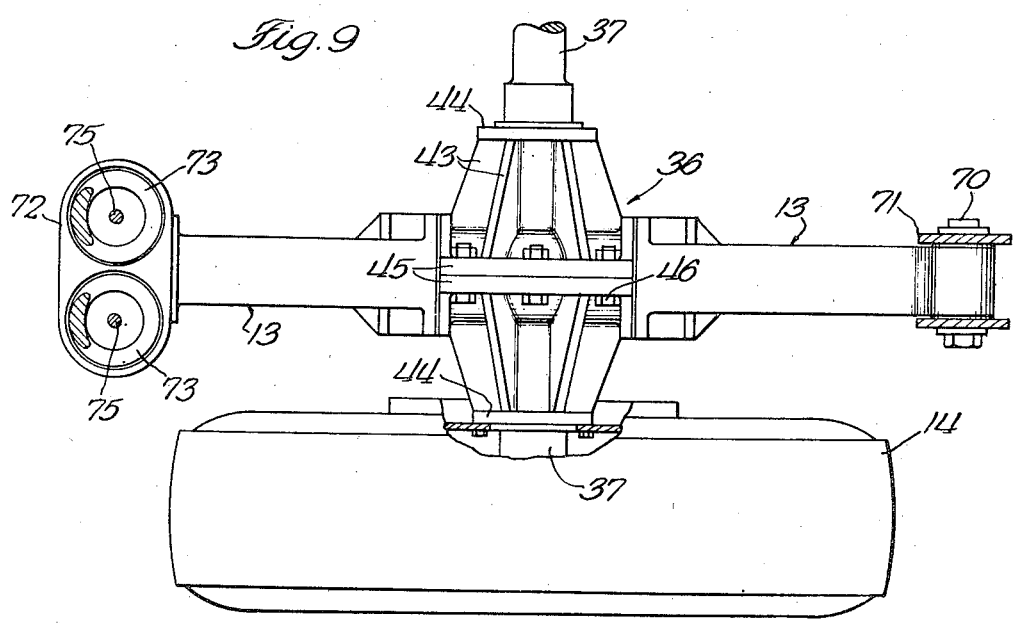
Figure 9 is a view taken on the line 9—9 of Figure 8 and showing a wheel on one of the oscillating axles of the front limber of the trailer.

The manner in which the oscillating axle units 36 are mounted on the beam 13 on the front limber is shown in Figures 8 and 9. The units 36 are assembled on split bushings around trunnions in a manner similar to the arrangement described in connection with the trunnions 40 on the beams 23. The beam 13 has an I-beam section and has its front end hung on a pin 70 in a bracket 71 similar to the bracket 21. The rear end of the beam 13 carries a dual spring cup 72 seating a pair of main springs 73. The springs 73 may contain either shock absorbers or auxiliary springs therewithin if desired. Passing through the springs 73 and through the bottom of the spring cups 72 in the preferred embodiment are a pair of bolts 75 hung in a spring base support 76 secured to the frame of the limber 12. Cushioning springs 77 are interposed between the spring cups 72 and nuts 78 on the ends of the bolts. In this construction the beam 13 is allowed limited vertical movement about the pin connection 70 while at the same time the wheel spindles 37 constitute oscillating axles having free pivotal movement on the walking beam trunnion.

Figure 10:
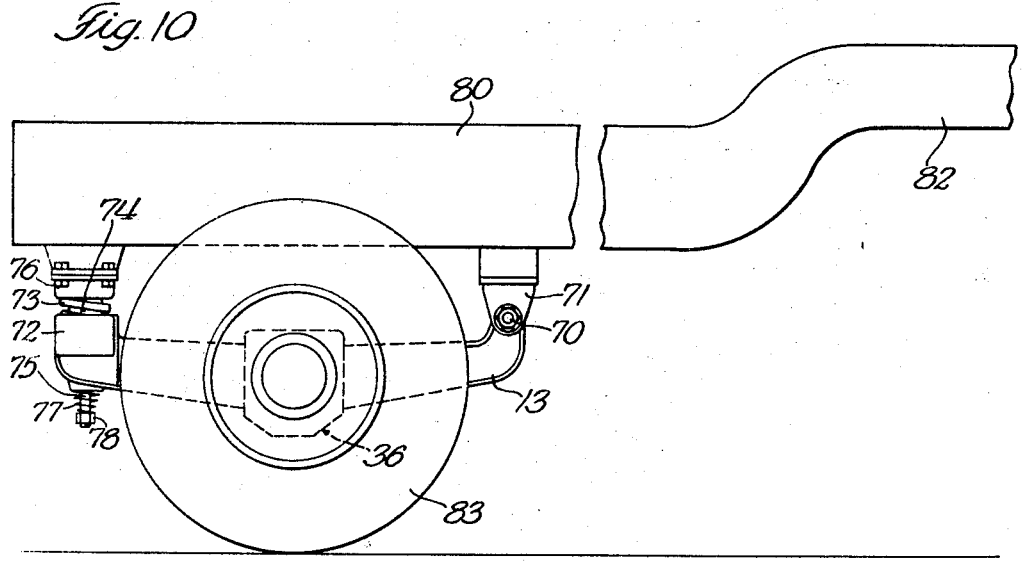
Figure 10 is a side view of a modification applied to a semi-trailer.
Figure 11:
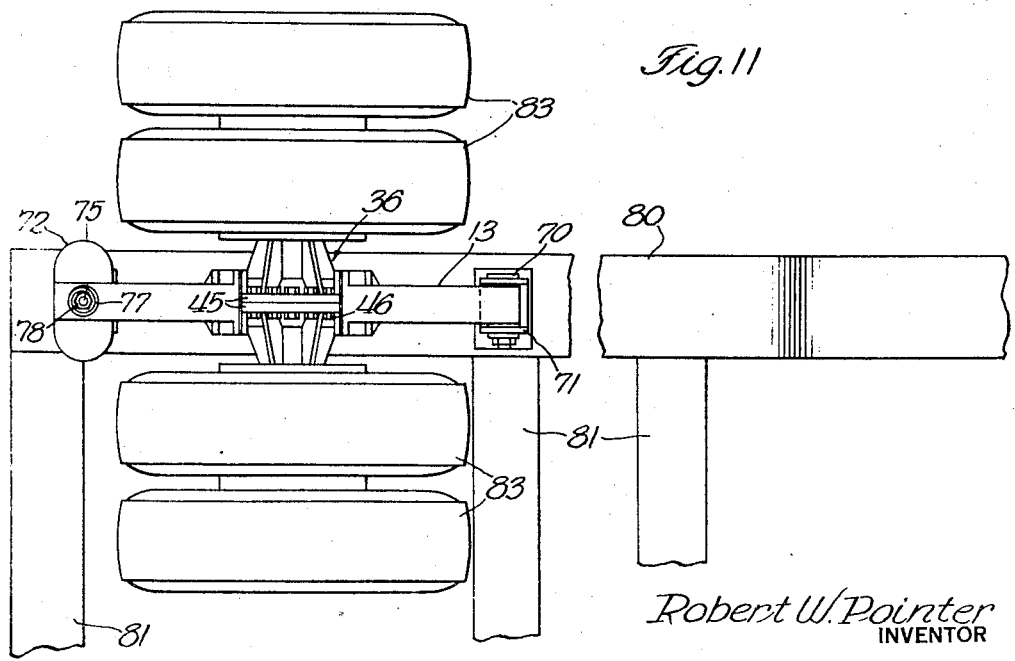
Figure 11 is a bottom plan view of a beam and oscillating axle on one side of the trailer shown in Figure 10.

Figures 10 and 11 illustrate an oscillating axle mounting similar to that shown in Figures 8 and 9 for use on a semi-trailer. In this embodiment each oscillating axle spindle carries dual wheels whereby eight tires are utilized to distribute the load across the tread width of the vehicle. The numeral 80 designates one of the longitudinal members of the vehicle frame, cross members being indicated by the numeral 81. The numeral 82 designates the front end of the semi-trailer associated with the fifth wheel attachment to the tractor unit. The beam 13 and its mountings correspond generally to the construction just described in Figures 8 and 9, like reference numerals designating similar parts. In this case, however, a single bolt 75 is placed between the springs 73 so that shock absorber units 74 may be contained therein. The oscillating axle units 36 are constructed as shown in Figures 5 and 6, except that spindles 37 suitable for dual wheels 83 are employed.

When double dual wheels are mounted on short oscillating axles in the manner shown in Figure 11, many of the usual disadvantages of rigid dual wheels are not present. The oscillating axles on opposite sides of the vehicle readily incline themselves to correspond to the crown of the road to preserve equality of load distribution on the tires and avoid riding on the inside tires. Similarly, if the vehicle is driven off the pavement on one side onto a higher or lower elevation, the short oscillating axles parallel themselves with the supporting surface to keep all the tires bearing upon the road, which is not possible with conventional dual wheels on conventional axles. In rolling over uneven ground the oscillating axles by their individual pivotal action avoid much lifting and jolting of the vehicle because they can make transverse adjustments to the ground surface without changing the height of the point of support. One of the fundamental advantages of dual wheels on oscillating axle spindles is, of course, the fact that such suspension enables the use of eight load supporting tires distributed across the width of the vehicle to carry great loads without a weight concentration in any one place.

Having now described my invention and in what manner the same may be used, what I claim as new and desire to protect by Letters Patent is:

1. In a vehicle suspension, a pair of pivotally interconnected longitudinal walking beams on the same side of the vehicle, a pair of oppositely directed wheel spindles pivotally mounted for oscillation on each of said walking beams, a fixed pivotal connection on the vehicle for one of said beams, and a shackle connection between the vehicle and the other beam to accommodate relative pivotal movement of the two beams.

2. In a vehicle suspension, a first walking beam having pivotal connection at one end with the frame of a vehicle, a pair of oppositely disposed wheel spindles pivotally mounted for oscillation on an intermediate portion of said beam, a second walking beam having one end connected with the other end of the first walking beam and having an intermediate portion pivotally connected with the frame of the vehicle, and a pair of oppositely directed wheel spindles pivotally mounted for oscillation on the other end of the second walking beam.

3. A dual beam oscillating axle vehicle suspension comprising a first walking beam having at one end a shackle connection with the frame of the vehicle and having a trunnion in its mid portion, a pair of oppositely directed axle spindles pivotally mounted for oscillation on said trunnion, a second walking beam pivotally connected at one end with the other end of said first walking beam, a fixed pivotal connection with said frame in an intermediate portion of the said second walking beam, a trunnion on the other end of said second walking beam, and a pair of oppositely directed axle spindles pivotally mounted for oscillation on said trunnion.

4. A dual beam oscillating axle suspension for vehicles comprising a pair of pivotally connected beams attached to the frame of the vehicle by pivotal connections for angular movements in a longitudinal vertical plane, and axle spindles pivotally mounted on said beams in pairs for oscillation in transverse vertical planes.

5. In an oscillating axle vehicle suspension, a walking beam having a trunnion integral therewith, an oscillating axle unit mounted for oscillation on said trunnion, a bearing tube in said walking beam, a bushing in said bearing tube, a second bushing within said first bushing, said second bushing being longer than said bearing tube and said first bushing, a shackle pin through said inner bushing, and a shackle clamped fixedly against the extending ends of said inner bushing by said shackle pin to make said shackle a rigid suspension member capable of resisting twisting stresses from said oscillating axle unit.

6. In an oscillating axle vehicle suspension, a walking beam comprising an intermediate trunnion for mounting an oscillating axle unit, an integral box construction on each end of said trunnion, and a bearing tube in one of said box ends for shackle connection with a vehicle frame.

7. In an oscillating axle vehicle suspension, a walking beam having an oscillating axle trunnion on one end thereof, a pin connection at the other end of said beam, a fixed bearing support for the vehicle in an intermediate part of said beam, a second walking beam pivotally connected at one end with said first mentioned walking beam through said pin connection and having an oscillating axle trunnion intermediate its ends, and a shackle support for the vehicle at the other end of said second beam.

8. In a vehicle suspension, a pair of walking beams each mounting wheels on an oscillating axle unit, pivotal means constituting fulcrums for said walking beams for supporting said vehicle thereon, and a pivotal connection between said walking beams neutralizing the weight and torque reactions of said wheels.

9. In an oscillating axle vehicle suspension, a walking beam, a trunnion intermediate the ends of said beam for mounting an oscillating axle unit, transverse pin connector means in the ends of said beam, a shackle for supporting the vehicle on said pin connector means in one end of the beam, a second beam directly connected with said pin connector in the other end of the first beam, an oscillating axle on said second beam, and a fixed pivot on the vehicle for said second beam.

10. In an oscillating axle vehicle suspension, a walking beam, a trunnion intermediate the ends of said beam for mounting an oscillating axle unit, a shackle connecting one end of said beam with the vehicle, a transverse pin connector in the other end of said beam, a second beam pivotally connected directly with said pin, a trunnion on said second beam for mounting an oscillating axle unit, and a pivotal connector for the vehicle on said second beam.

ROBERT W. POINTER.

REFERENCES CITED

The following references are of record in the file of this patent:

UNITED STATES PATENTS

| Number | Name | Date |
|---|---|---|
| 1,690,247 | Reid | Nov. 6, 1928 |
| 1,762,915 | Davis | June 10, 1930 |
| 1,934,670 | Hickman | Nov. 7, 1933 |
| 1,940,914 | Marcum | Dec. 26, 1933 |
| 1,989,745 | Farris | Feb. 5, 1935 |
| 2,094,882 | Garnett et al. | Oct. 5, 1937 |
| 2,121,862 | Dodge | June 28, 1938 |
| 2,254,452 | Ronning | Sept. 2, 1941 |
| 2,336,814 | Suter | Dec. 14, 1943 |
| 2,395,640 | Pearson | Feb. 26, 1946 |

FOREIGN PATENTS

| Number | Country | Date |
|---|---|---|
| 293,654 | Great Britain | July 12, 1928 |